March 22, 1966  L. L. RAKOCZI  3,242,464
DATA PROCESSING SYSTEM
Filed July 31, 1961  6 Sheets-Sheet 1
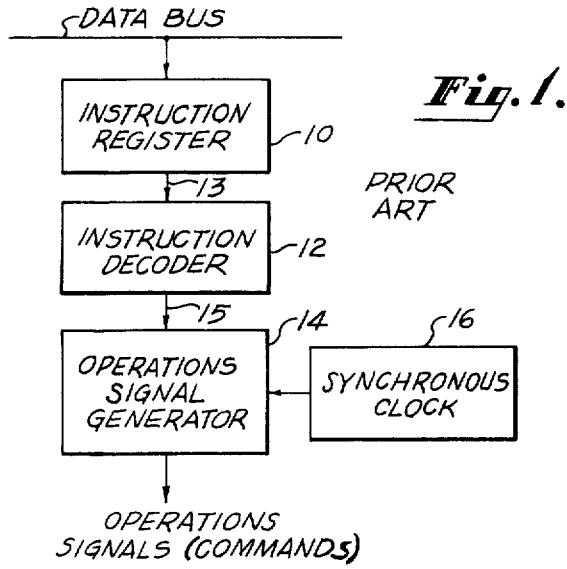
Fig. 1.
PRIOR ART
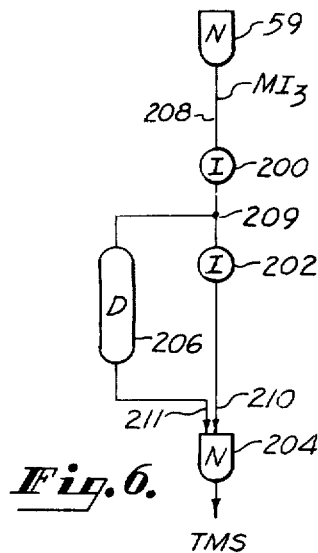
Fig. 6.
Fig. 2a. Fig. 2b. Fig. 2c. Fig. 2d. Fig. 2e.
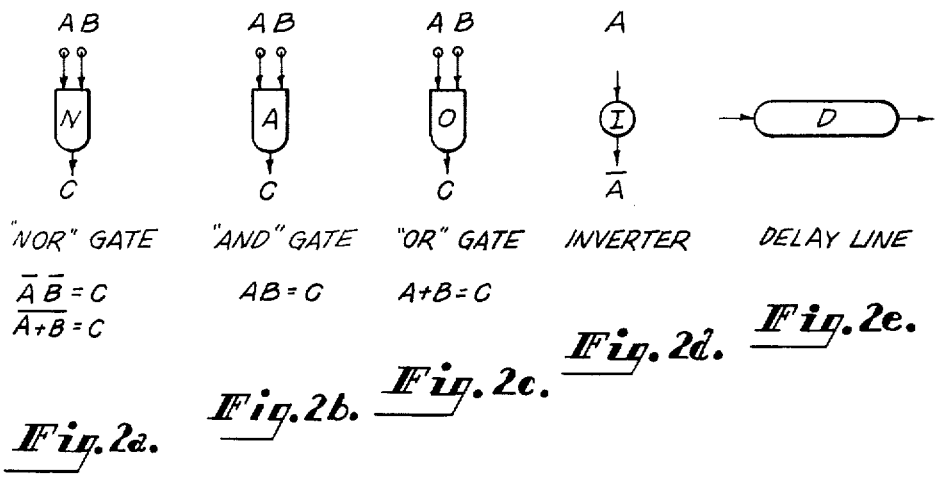
"NOR" GATE    "AND" GATE    "OR" GATE    INVERTER    DELAY LINE
$\overline{A}\,\overline{B} = C$    $AB = C$    $A+B = C$
$\overline{A+B} = C$
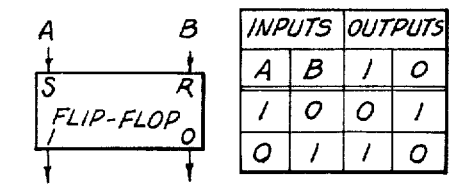
Fig. 2f.
INVENTOR.
LASZLO L. RAKOCZI
BY
ATTORNEY

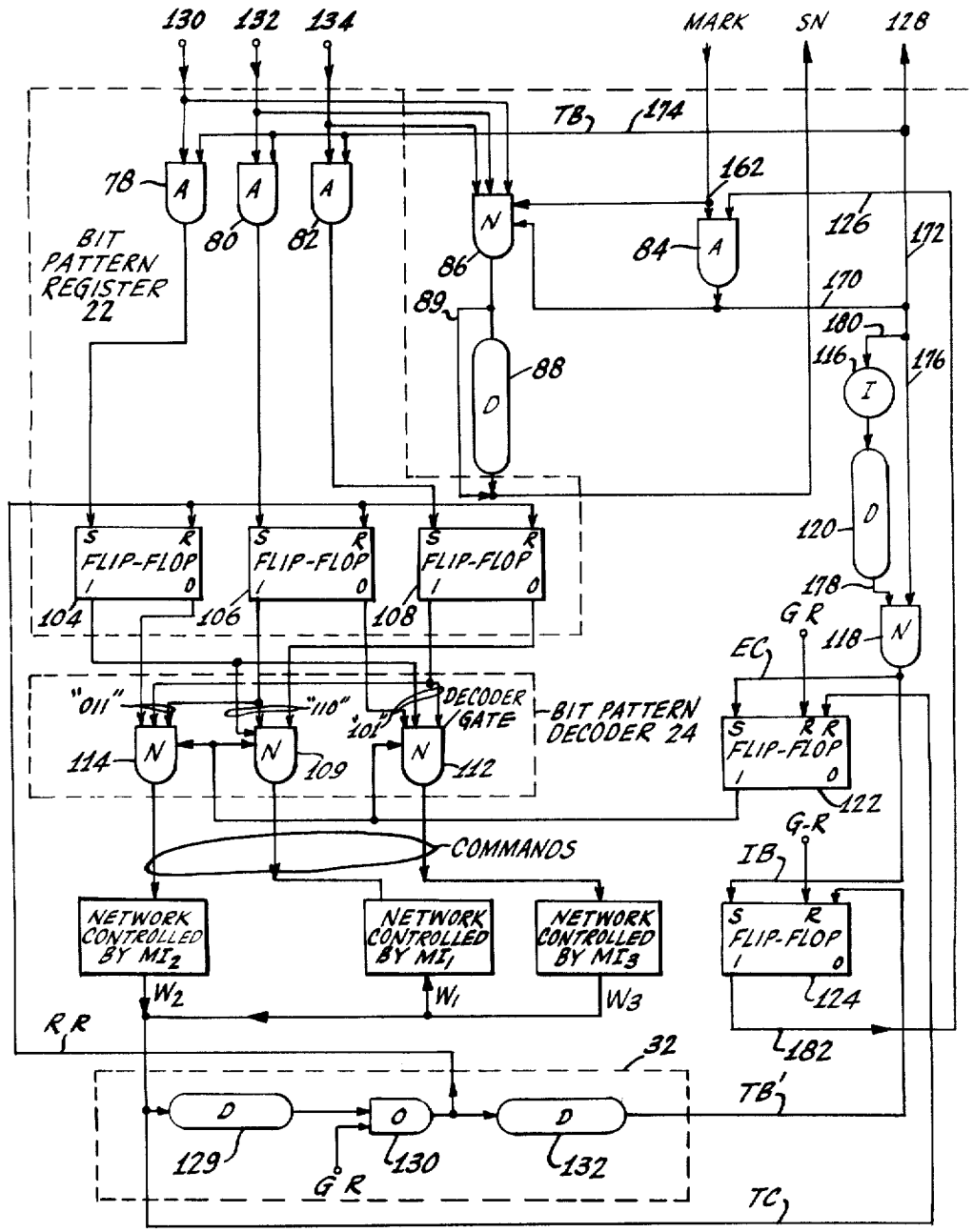

March 22, 1966     L. L. RAKOCZI     3,242,464

DATA PROCESSING SYSTEM

Filed July 31, 1961     6 Sheets-Sheet 5

March 22, 1966     L. L. RAKOCZI     3,242,464

DATA PROCESSING SYSTEM

Filed July 31, 1961     6 Sheets-Sheet 6

| | 80 | 82 | 84 | 109 | 118 | A | B | $\bar{A}$ | $\bar{B}$ | REMARKS |
|---|---|---|---|---|---|---|---|---|---|---|
| 1. | D | D | D | D | E | 1 | 1 | 0 | 0 | FF 40 SET, $MI_1$ GENERATED, $BP_1$ GENERATED |
| 2. | — | — | — | — | — | — | — | — | — | MARK = 1, "10" STORED IN B.P.R. |
| 3. | E | — | E | E | D | — | — | — | — | ENABLE DECODER GATES; DISABLE BP GEN.; DISABLE $MI.G.$ |
| 4. | D | — | D | E | — | — | — | — | — | RESET FF 92 RENABLING B.P.G. |
| 5. | — | — | — | — | — | — | — | — | — | THE 1,0 STORED IN 40, 42 IS TRANSFERRED TO F.F.S. 52, 54 |
| 6. | — | — | — | — | E | 0 | 1 | 1 | 0 | GEN. $MI_2$; GEN. $BP_2$ |
| 7. | — | — | — | — | — | — | — | — | — | DISABLE DECODER GATES |
| 8. | — | — | — | D | — | — | — | — | — | RESET B.P.R. |
| 9. | — | — | — | — | — | — | — | — | — | TRANSFER $BP_2$ TO B.P.R. |
| 10. | E | E | E | — | — | — | — | — | — | ENABLE DECODER GATES; DISABLE $MI.GEN.$; DISABLE B.P.G. |
| 11. | D | D | D | E | D | — | — | — | — | RESET F.F. 92, RENABLING B.P.G. |
| 12. | — | — | — | — | — | — | — | — | — | |
| 13. | — | — | — | — | — | 0 | 1 | 1 | 1 | THE "11" STORED IN 40, 42 TRANSFERRED TO F.F.S. 52, 54 |

*Fig. 7b.*

INVENTOR.
LASZLO L. RAKOCZI

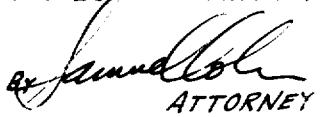

ATTORNEY

United States Patent Office 3,242,464
Patented Mar. 22, 1966

3,242,464
DATA PROCESSING SYSTEM
Laszlo L. Rakoczi, Merchantville, N.J., assignor to Radio
Corporation of America, a corporation of Delaware
Filed July 31, 1961, Ser. No. 128,001
15 Claims. (Cl. 340—172.5)

The present invention relates to the control of a data processing system such as a digital computer. More particularly, the invention relates to improved circuits in a digital data processing system which receive the operation code stored in an instruction decoder and convert it to a sequence of command signals sometimes known as operations signals.

*Brief description of invention*

In the system of the invention a decoded operation code is converted to a sequence of machine instruction signals. Each machine instruction signal is translated to a bit pattern which is stored in a bit pattern register. Each stored bit pattern is converted to one or several command signals. The command signals, if there are more than one per bit pattern, can be concurrent, or can occur in time sequence.

The system is completely asynchronous in the sense that the command signal or signals are controlled, not by a clock, but instead by "return" signals from the stages performing the operations called for by the command signals. Each command signal is therefore of a duration determined by the length of time required to perform the operation called for by that signal. Moreover, the intermediate steps in the creation of the command signals are themselves asynchronous. For example, during the time a command signal corresponding to a first machine instruction signal is applied to a stage which is executing some computer operation, the second machine instruction signal may already be generated, the bit pattern corresponding thereto may already be generated and waiting to transfer into the bit pattern register, and the third machine instruction signal may be ready to be generated. These signals, in effect, queue up to save the time required to generate the signals and the transmission time through the buses among the various stages which generate the signals. As soon as the operation being executed is completed, the command signal or signals are terminated; the next bit pattern is transferred into the bit pattern register; the command signal or signals corresponding thereto are generated and applied to execution circuits which execute the operation or operations directed; the next (third) machine instruction signal is generated; the bit pattern corresponding thereto is generated and queues up on the bus leading to the bit pattern register, and so on.

*Brief description of drawings*

FIG. 1 is a block circuit diagram of prior art control circuits of the computer;

FIGS. 2a through 2f are diagrams to explain the symbols employed in FIGS. 4 and 5;

FIGS. 4 and 5 together comprise a more detailed diagram of the circuit shown in FIG. 3;

FIG. 6 is a block circuit diagram of a circuit for resetting the machine instruction generator shown in FIG. 4; and FIGS. 7a and 7b together comprise a chart summarizing the condition of various stages in the system at various times.

Similar reference numerals are applied to similar system components through the figures.

*General*

Figure 3:
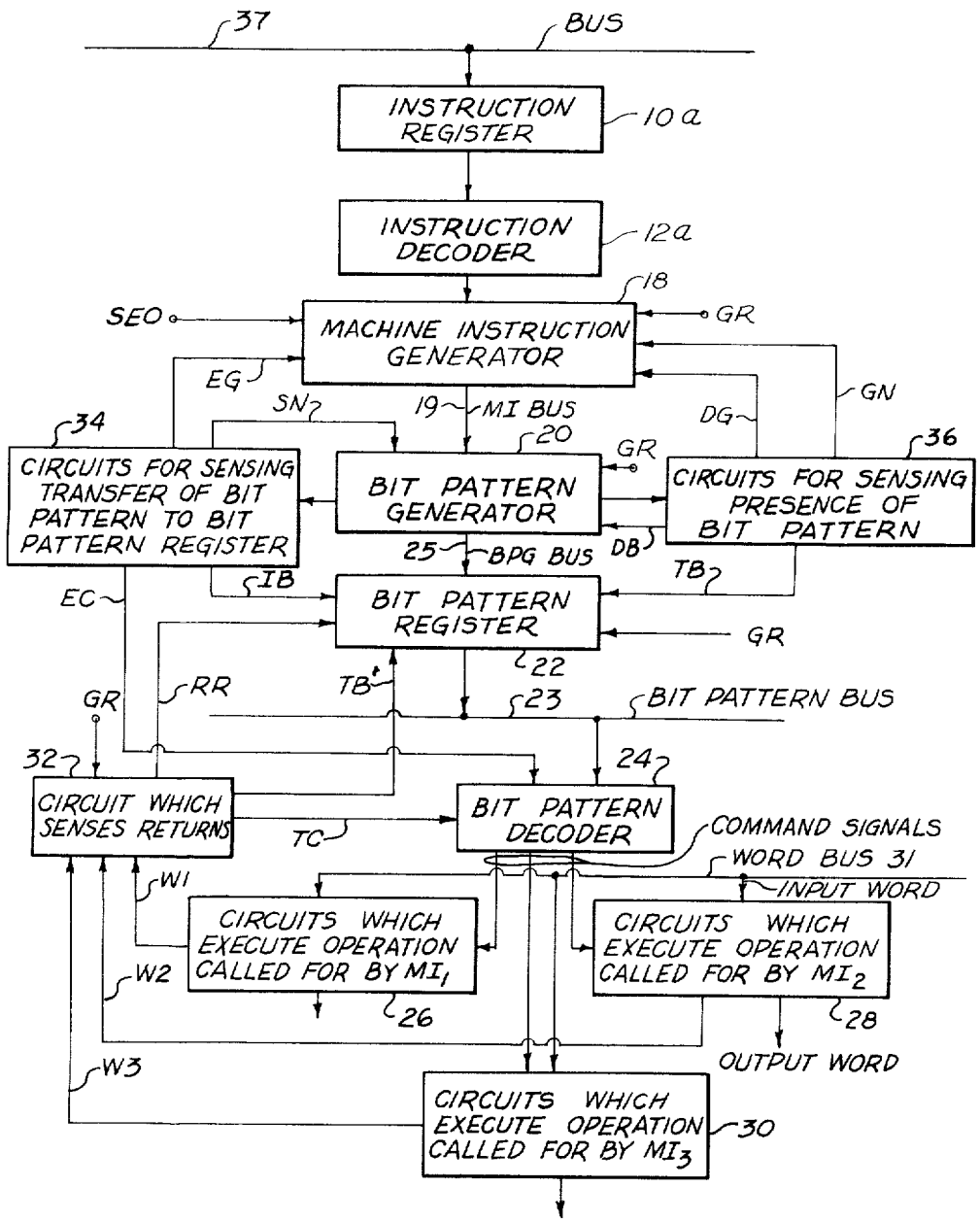
FIG. 3 is a block circuit diagram of the present invention.

A number of blocks shown in the figures represent known circuits. The circuits of the blocks are actuated by electrical signals applied to the blocks. When a signal is at one level, it represents the binary digit "one" and when it is at another level, such as zero volts, it represents the binary digit "zero." For the sake of the discussion which follows, it may be assumed that a high level signal represents the binary digit "one" and a low level signal the binary digit "zero." Also, to simplify the discussion, rather than speaking of an electrical signal being applied to a block or logic stage, it is sometimes stated that a "one" or a "zero" is applied to a block or logic stage.

Throughout the figures capital letters are used to represent signals indicative of binary digits. For example, A may represent the binary digit "zero" or the binary digit "one." $\overline{A}$ represents the complement of A. In some cases, letters are employed in Boolean equations as a convenient means for describing the circuit operation. In some cases, more than one capital letter is employed to describe a signal. For example, SN is the signal which, when it represents the binary digit "one," commands the bit pattern generator to send the next bit pattern toward the bit pattern register.

A number of elementary logic circuits are present in various ones of the figures. The symbols which are employed and the Boolean equations are shown in FIGS. 2a through 2f. For example, FIG. 2a illustrates a "nor" gate which is also sometimes known as a "none" gate. This gate may consist of an "and" gate which has an inverter in series with each of its input leads. Alternatively, it may consist of an "or" gate followed by an inverter. Regardless of the way in which the "nor" gate is implemented, its Boolean equation in the case in which there are inputs A and B and one output C is $\overline{AB} = C$ or $\overline{A+B} = C$.

The convention adopted for a flip-flop is somewhat different than that usually employed. When the flip-flop is set, it produces a "one" output at its 0 output terminal and a "zero" output at its 1 output terminal. When the flip-flop is reset, it produces a "one" output at its 1 output terminal and a "zero" output at its 0 output terminal. This is shown in FIG. 2f.

An instruction consists of a number of binary bits which indicate a desired computer operation, how it is to be performed, the addresses in the memory of the data words on which the operation is to be performed, and so on. The instruction may initially be stored in a memory and, upon command, transmitted from the memory to an instruction register. In the present discussion only the portion of the instruction dealing with the "operation" to be performed is of interest.

*Control circuits of prior art computers*

Typical control circuits for computers are discussed in Chapters 17 and 18 of the volume, Digital Computer and Control Engineering, by R. S. Ledley. The circuit of FIG. 1 is like one of those shown by Ledley. The purpose of discussing this circuit is to orient the reader with respect to the circuits shown in FIGS. 3–5 so that the reader may better understand where in a computer the present invention may be employed.

The instruction register 10 of FIG. 1 receives from the memory an instruction word. The portion of the word of interest here is known as the operation portion and, in general, is part of the instruction word. If the operation portion of the instruction word is made up of $n$ binary bits, the instruction register must include $n$ flip-flops, one for storing each binary bit.

The instruction decoder 12 is connected to the instruction register 10 by a bus 13. The bus 13 may include $n$ conductors, one for each binary bit or $2n$ conductors, a conductor for carrying the binary bits of the word and $n$ conductors for carrying the complement of the word. In the latter case, each flip-flop has two outputs, one for the 0 output terminal and the other for the 1 output terminal.

The function of the instruction decoder is to produce a unique signal for the particular operation word stored in the register 10. If there are $2^n$ different operation codes which are possible, then the instruction decoder can produce any one of $2^n$ different output signals. The bus 15 at the output of the instruction decoder may contain $2^n$ conductors, one for each of the signals the decoder is capable of producing.

The output of the instruction decoder is applied to an operations signal generator. This generator also receives timing pulses from a synchronous clock 16. This stage produces pulses of fixed duration which are spaced from one another by fixed time intervals. The operation signal generator produces one or more operations signals, sometimes also known as command signals or commands, for each operation code. These operations signals usually are applied directly to the stages which actually perform the operation directed by the operation code. For example, an operation signal may direct the words stored in addend and augend registers to be transferred to an adder. Other typical operations which may be commanded by the operations signals are subtraction, multiplication, shifting, clearing, transferring and so on.

*Discussion of problem dealt with in the present application*

The problem dealt with in the present application is that of increasing the speed of performing various computer operations such as described above. As may be seen in FIG. 1, the operations signal generator is controlled by a synchronous clock. The clock pulses, by definition, have a definite predetermined spacing. However, there are a number of stages in the computer which do not require the same amount of time to perform even the same operation under different conditions. For example, in the case of a particular 48 bit adder, the addition time is 3 microseconds in the worst case, that is, when there are a maximum number of carries, 0.1 microsecond in the best case, and 0.5 microsecond on the average. In the case of the prior art arrangement such as exemplified by FIG. 1, the operation signal applied to the adder must have a duration of at least 3 microseconds— a time sufficient to allow for the worst case, that is, the longest addition time. Moreover, in practice, additional delays are always added as a safety factor.

The lengths of transmission lines along which the different operations signals must travel may be substantially different and may require different transmission times. A synchronous data processing system must take the worst case condition, that is, the longest transmission time for an operations signal, into account in the design of the synchronous clock. This means, in effect, that even though an operation signal reaches its destination in a fraction of the longest transmission time and the operation commanded by the signal is completed in only a fraction of the worst case time, the computer cannot begin its next operation until the worst case time has elapsed, that is, until the synchronous clock produces the next clock pulse.

In the more expensive "sophisticated" synchronous machines presently available, the operations signal duration is made different for different operation codes in order to compensate to some extent for the system inadequacy discussed above. However, this requires either one complicated synchronous clock system or several different synchronous clocks. The control logic circuits in both cases are complicated and expensive. And, even more important, the flexibility of these types of machines is highly limited. Any change in the machine or expansion of the machine requires major modifications. Moreover, the individual operations such as addition, still require the worst case delay.

The problems above are solved in the present invention by controlling the operations signal generator of FIG. 1 not by a clock but instead by "return" signals which indicate that the operation directed has been completed. In other words, the operations signals generator of the invention is made completely asynchronous. In addition, the operations signal generator is made much more powerful and more flexible by substituting for the single block 14 of FIG. 1 circuits which produce sequences of single or groups of operations signals for each operation code.

However, even this does not realize from the system the full operational speed of which it is capable. There may be relatively long transmission paths and corresponding signal delays between the instruction decoder and the stages which ultimately receive the operations signals, and there may be delays in the circuits which produce the operations signals. Therefore, even if the operations signal generator is made asynchronous, considerable time is lost between the time at which an operations code occurs and time at which an operations signal is transmitted to its destination.

These problems are also solved in the present invention. As mentioned in the introduction and as is discussed more fully later, the various signals generated in the circuits of the invention are permitted to queue up in various parts of the circuits during the time each operation is being performed. As soon as one operation is completed, a signal which is already waiting causes the next operation signal to be generated. Simultaneously, the signals which are required for the following operation are generated and placed on the various buses in anticipation of the completion of the operation just started.

*System of present invention*

The system of the present invention is illustrated in FIG. 3. The instruction register 10a and instruction decoder 12a are analogous to stages 10 and 12 of FIG. 1. The instruction decoder is connected to a machine instruction generator 18. It produces a sequence of machine instruction signals (MI's) for each operation code stored in the instruction register. The succeeding machine instruction signals are applied to a bit pattern generator 20. In general, the generator 20 produces a different pattern of binary bits for each machine instruction it receives. It is possible for the same bit pattern to be generated more than once in response to two different machine instructions signals in one sequence of such signals, under certain conditions. However, this need not be considered in the present discussion. The bit pattern generated at the generator 20 is stored in a bit pattern register 22. The bit pattern register applies its output via bit pattern bus 23 to a bit pattern decoder 24. This stage includes gates which are known as recognition gates. These gates produce the command signals analogous to the operations signals of FIG. 1.

Each machine instruction signal corresponds to one command signal or to several simultaneously occurring command signals. The command signal or signals may be applied to one circuit or to a group of circuits. For the purposes of illustration, the command signal corresponding to $MI_1$ is shown applied to a circuit 26; the command signal corresponding to machine instruction $MI_2$ is shown applied to a circuit 28; the command signal corresponding to machine instruction signal $MI_3$ is shown applied to circuit 30. The circuits 26, 28 and 30 also receive data words from bus 31. Upon receipt of a command signal or signals by a stage such as 26, that stage performs the operation called for by the operation code and, when it has completed that operation, produces an output data word and a return $W_1$. The output data word is applied to some other circuit in the computer such as a register or the like.

Figure 4:
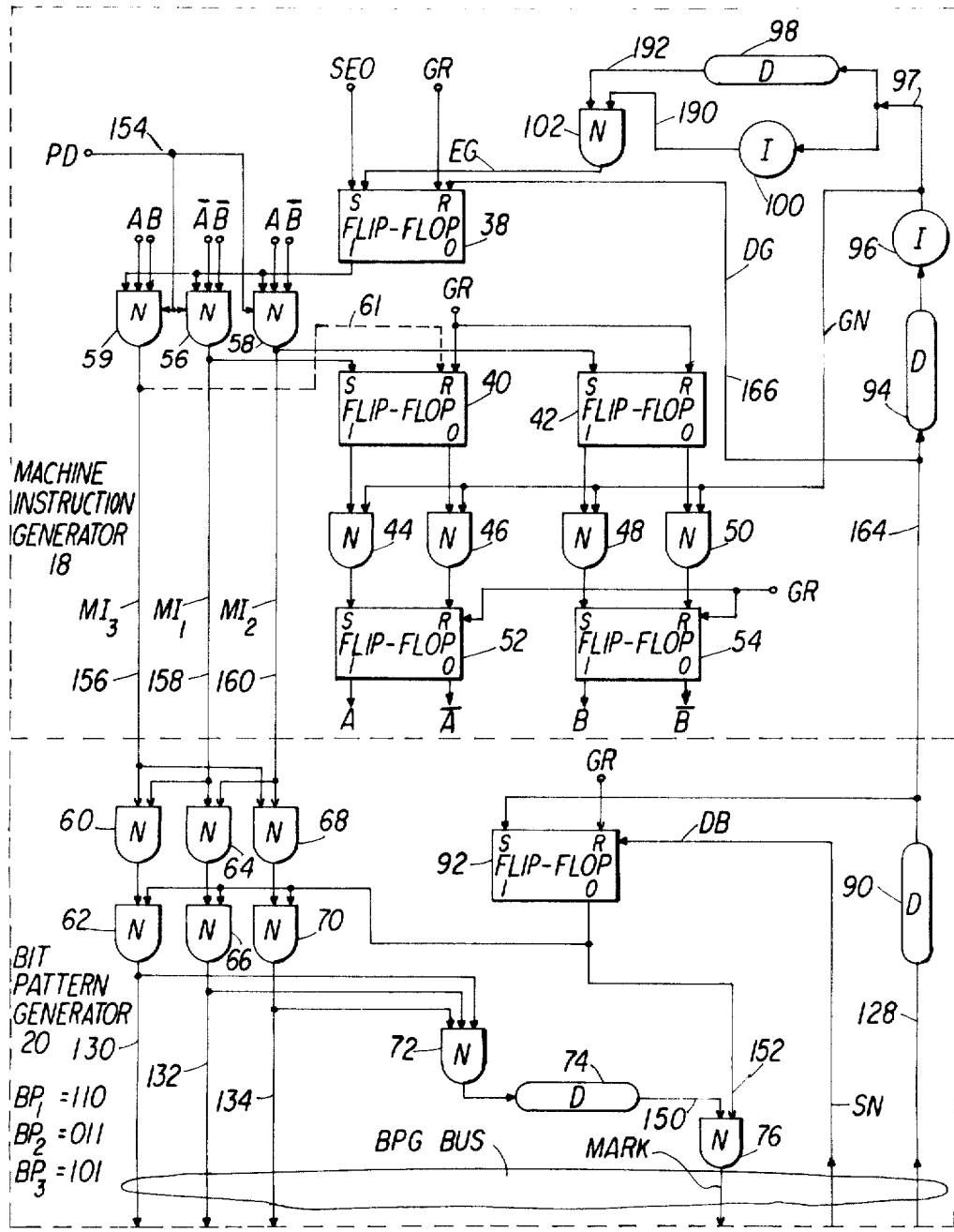

The circuits 26, 28 and 30 may be asynchronous circuits, synchronous circuits, or mixed synchronous and asynchronous circuits. A typical set of circuits to which one block such as 26 may correspond may include a synchronous switch, an asynchronous binary adder, a synchronous excess 3 converter, and a synchronous input switch to accumulators. These particular circuits are illustrated in FIG. 4 of application Serial No. 112,677, filed May 25, 1961, by L. L. Rakoczi and F. L. Wang and assigned to the same assignee as the present invention. In this particular case, there are four simultaneously occurring command signals which are sent out on four different wires such as 22, 24, 26 and 28 of FIG. 1 of the above-identified application. The return signal $W_1$ which is generated when the entire operation is completed corresponds to the output R of delay means 73 shown in FIG. 4 of the application identified above.

Another example of circuits represented by a block such as 26 is a transmitting register and a receiving register. In this case, the command consists of a signal sent out on one wire for enabling the output gates of the transmitting register, a signal sent out on another wire for enabling the input gates of the receiving register, and a signal sent out on a third wire for enabling the output gates of the receiving register thereby permitting the receiving register to feed back the word it receives to a feedback bus. Circuits of this type are shown in application Serial No. 62,644, filed October 14, 1960, by L. L. Rakoczi and E. Gloates and assigned to the same assignee as the present invention. The transmitting and receiving registers are shown in block diagram form in FIG. 1 of the application. This figure also shows a comparator circuit for generating a return W when the transmitted word has been received by the receiving register. The comparator compares the word on the feedback bus with the word on the bus leading to the receiving register.

The returns generated by the circuits 26, 28 and 30 are applied to a circuit 32 which senses the returns and performs certain other operations as discussed in more detail later. The system of FIG. 3 also includes circuits 34 for sensing the transfer of a bit pattern to the bit pattern register for performing certain operations. Finally, the arrangement of FIG. 3 includes circuits 36 for sensing the presence of a bit pattern and for performing certain other operations in response to this presence. Actually, the circuits 34 and 36 are distributed throughout the other stages shown in FIG. 3 and certain circuits in blocks 36 and 34 are common to both blocks. The details of these circuits are shown in FIGS. 4 and 5 and are discussed later.

In the operation of the system of FIG. 3, an instruction word in the memory is initially transferred via bus 37 to the instruction register. In the practical system under discussion this transfer is effected by a sequence of machine instructions produced by another machine instruction generator (not shown). The steps in the transfer include reading the instruction word out of a memory location specified by an instruction control counter (not shown) and into the memory register (not shown), then transferring the word in the memory register to the instruction register 10a. However, for purposes of the present explanation, any other method of transferring an instruction word into the instruction register is also suitable.

The operation portion of the word is decoded by the instruction decoder and applied to the machine instruction generator. This code directs the machine instruction generator to produce a sequence of machine instruction signals. In response to this code a pulse signal SE0 (start execution of operation), the machine instruction generator 18 generates the first machine instruction signal $MI_1$.

In practice, the signal SE0 comes from another machine instruction generator (not shown). The signal SE0 is produced by the other machine instruction generator when the latter has completed a sequence of operations. This sequence of operations includes resetting the instruction register, advancing the instruction control counter (not shown) to produce a new memory address, storing this address in the memory address register, addressing the memory with the new address, extracting the word stored in the new memory address from the memory and placing it in the memory register, transferring the word from the memory register to the instruction register, and a number of other functions. Since these various functions are somewhat removed from the present invention, for the purposes of this discussion it may be considered that the signal SE0 is simply a start pulse of sufficient duration to set flip-flop 38 (FIG. 4) which is applied to the machine instruction generator either by a start pulse generator or from the program staticizing area of the computer.

One further signal which will be discussed in more detail later is a signal GR. This is a general reset signal which is applied to the various stages shown in FIG. 3 when the data processing system is started. This signal resets many registers as is explained in more detail later. The general reset signal comes from the console (not shown) of the data processing system. It is applied after the "power-on" switch (not shown) has been turned on. The purpose of the GR signal is to set the computer to an initial starting state.

Returning now to the machine instruction generator, the first machine instruction signal $MI_1$ has been generated. This is applied via machine instruction bus 19 to the bit pattern generator 20. The bit pattern generator produces a unique pattern of bits for each different machine instruction signal. The presence of this pattern of bits is sensed by the circuit 36. It applies a signal TB (transfer bit pattern to bit pattern register) to the bit pattern register whereupon the bit pattern is stored in the register. The circuit 36 also applies a signal DB to the bit pattern generator. Its function is to disable the output gates of the bit pattern generator. The circuit 36 also applies a signal DG to the machine instruction generator. The purpose of this signal is to disable the output gates of the machine instruction generator. The circuit 36 also applies a signal GN to the machine instruction generator. Its purpose is to start the generation of the next machine instruction signal, namely $MI_2$.

The circuit 34 senses the transfer of the bit pattern from the bit pattern generator to the bit pattern register. It first disables the input gates to the bit pattern register and then applies a signal IB to a circuit which essentially holds or latches the input gates of the bit pattern register in a disabled condition. The circuit 34 also applies a signal EC to a circuit connected to the bit pattern decoder 24. This signal enables the decoder gates and permits the one corresponding to the bit pattern stored in the bit pattern register to transmit a command signal to the circuit which is to execute the command. In the present instance, the command signal is transmitted to the circuits represented by block 26.

To digress for a moment, it has been previously mentioned that a machine instruction signal can correspond to a single output signal from a decoder gate or to several output signals or even to a sequence of signals. Nevertheless, for the purposes of keeping the explanation simple, in the circuit shown in detail later, each decoder gate produces only a single command signal.

Returning now to the circuit of FIG. 3, after a bit pattern has been transferred to the bit pattern register, the input gates to the register have been inhibited and the decoder gates have been enabled (EC). To continue, the circuits 34 generate also a signal EG which is applied to the machine instruction generator. Its purpose is to enable the output gates of the machine instruction generator to permit the second machine instruction signal, which has already been generated, to be applied to the bit pattern generator. Finally, the circuits 34 produce a signal SN. Its purpose is to enable the output gates of the bit pattern generator by resetting flip-flop 92 of FIG. 4 so that the bit pattern can be generated onto BPG bus 25 and applied to the input gates to the bit pattern register. These input gates, it should be recalled, are presently disabled so that the bit pattern corresponding to $MI_2$ cannot pass through the generator and into the bit pattern register. Instead, the bit pattern waits on the BPG bus 25.

When the operation or series of operations called for by machine instruction 1 is completed, the circuits 26 generate return $W_1$. The circuit 32 senses the return $W_1$ and performs the following functions in the order named. It applies a signal TC to the decoder gates. This signal disables the decoder gates and terminates the transmission of the command to the circuits 26. The circuit 32 next generates a signal RR and applies it to the bit pattern register. Its purpose is to reset the bit pattern register. Finally, the circuit 32 generates a signal TB' and applies it to the bit pattern register. This signal essentially unlatches the input gates to the bit pattern register, these gates become enabled, and the bit pattern waiting on the bit pattern generator bus is transmitted through the input gates to the bit pattern register.

The cycle discussed above is subsequently repeated as many times as there are machine instruction signals. For example, as soon as the bit pattern corresponding to the second machine instruction signal is sensed and stored, the output gates of the machine instruction generator are disabled, the machine instruction generator is commanded to begin the generation of the third machine instruction signal and so on. Each bit pattern which is generated queues up on the bit pattern generator bus until a return is received which indicates that the command corresponding to the previous bit pattern has been executed. Thereafter, the bit pattern register is reset, the new bit pattern is applied to the bit pattern register, the decoder gates are enabled and so on.

When all of the machine instructions in a given sequence have been "executed," a signal is generated which causes a new instruction word to be transferred from the memory to the instruction register 10a. Thereupon, the instruction decoder 12a produces a new output which may be applied to another machine instruction generator (not shown) or to the same machine instruction generator 18 for generating a different sequence of machine instruction pulses. In any case, the signal from the instruction decorder 12a to the machine instruction generator 18 changes so that the cycle of operation just discussed terminates.

It is mentioned above that the machine instruction generator 18 can be one of the type which is capable of producing more than one sequence of machine instruction signals. For example, one sequence may be $MI_1$, $MI_2$, $MI_3$. A second sequence may be $MI_2$, $MI_5$, $MI_6$. Still another sequence may be $MI_1$, $MI_5$, $MI_7$, $MI_8$ and so on. A machine instruction generator of this type is not shown in the present application to avoid unduly complicating the explanation. A circuit for generating different sequences of machine instruction signals in response to different input codes is described in application Serial No. 85,625, filed January 27, 1961, by L. L. Rakoczi and L. M. Paoletti and assigned to the same assignee as the present invention.

It is also mentioned above that a complete data processing system may include several machine instruction generators. The other machine instruction generators may be connected to the instruction decoder 12a and respond to other operation codes stored in the instruction decoder 12a. In general, only one machine instruction generator is actuated by the instruction decoder at a time.

Detailed explanation of the system

A more detailed drawing of the arrangement of FIG. 3 appears in FIGS. 4 and 5. FIG. 4 should be placed immediately above FIG. 5 as indicated in the legend on FIG. 5.

The machine instruction generator 18 includes five flip-flops 38, 40, 42, 52, and 54. "Nor" gates 44, 46, 48 and 50 receive the outputs of flip-flops 40 and 42 and apply set and reset signals to the flip-flops 52 and 54. The outputs of flip-flops 52 and 54 serve as inputs to the three "nor" gates 56, 58, and 59. As can be seen in the drawing, each "nor" gate receives a different combination of inputs. It is evident that a fourth "nor" gate could be added which receives the inputs $\overline{A}\overline{B}$ for producing a fourth machine instruction signal $MI_4$. (In a circuit of this type there would be a connection from the output of "nor" gate 59 to the reset terminal of flip-flop 40 as indicated by the dashed line 61.) However, only three such gates are shown for the sake of drawing simplicity.

As an aside, it should be mentioned that in an actual machine in which the present invention is embodied, the portion of the instruction word of interest contains seven bits. This means that up to $2^7$ or 128 different codes are possible. Each machine instruction generator which receives this operation code may generate many more than three or four machine instruction signals in sequence. Thus, in practice, rather than having two flip-flops corresponding to 52 and 54, the actual machine instruction generators employed in the computer may include four, eight, or more flip-flops and there may be a correspondingly large number of "nor" gates each receiving a different combination of flip-flop outputs. For example, with eight flip-flops there may be up to $2^8$ or 256 "nor" gates corresponding to 56, 58, 59. Nevertheless, in the interest of simplifying the discussion, a fewer number of stages are shown. The principle of operation is exactly the same for this simplified generator and simplified following stages as for the system with more stages.

Returning now to FIG. 4, the "nor" gates 56, 58 and 59 produce the machine instruction signals $MI_1$, $MI_2$ and $MI_3$. As will be shown in more detail later, these signals are generated in time sequence as indicated by the subscripts 1, 2, and 3.

The flip-flops 40, 42 can be considered as a first register. The flip-flops are set and reset by inputs from gates 56, 58 and 59. These change the pattern of bits stored by the register. The flip-flops 52 and 54 can be considered as a second register. The gates 56, 58 and 59 can be considered decoder output gates for the generator. These receive the outputs of the second register.

The bit pattern generator 20 includes input "nor" gates 64, 68 and 60 which receive the three machine instruction signals. For example, machine instruction signal $MI_1$ is applied to "nor" gates 60 and 64. Machine instruction signal $MI_2$ is applied to "nor" gates 64 and 68. The "nor" gates 60, 64 and 68 apply their outputs to "nor" gates 62, 66 and 70, respectively. The second input to the "nor" gates 62, 66 and 70 is the 0 output of flip-flop 92.

A part of the circuit 36 (FIG. 3) for sensing the presence of a bit pattern includes "nor" gate 72, delay line 74 and "nor" gate 76. In the absence of a bit pattern, that is, when "nor" gates 62, 66 and 70 are disabled, "nor" gate 72 receives all zeros as inputs and produces a "one" output. This "one" output serves as an input to "nor" gate 76 so that the mark signal output of "nor" gate 76 is a "zero." However, as soon as one or more of the "nor" gates 62, 66 and 70 produces a "one" output, "nor" gate 72 is enabled and, after the delay imparted by delay means 74, "nor" gate 76 receives a "zero" on one of its inputs 150. Flip-flop 92 is reset when one or more of the "nor" gates 62, 66, 70 is enabled so that the second input 152 to "nor" gate 76 is also "zero" and a mark signal appears indicating the presence of a full bit pattern on the BPG bus. The purpose of the delay inserted by delay means 74 is to insure that all generated ones are on the BPG bus before the mark signal is generated.

The bit pattern register 22 shown in FIG. 5 includes input "and" gates 78, 80 and 82 which receive as one input the outpus of "nor" gates 62, 66 and 70 (FIG. 4). The leads from "nor" gates 62, 66 and 70 are 130, 132 and 134. The "and" gates 78, 80 and 82 apply their outputs as set signals for flip-flops 104, 106 and 108.

The circuits 34 (FIG. 3) for sensing the transfer of a bit pattern to the bit pattern register include "nor" gate 86, delay line 88 and "and" gate 84. The delay line 88 is bypassed by lead 89 and serves merely to "stretch" the output of "nor" gate 86. The circuits 34 also include inverter 116, delay 120, "nor" gate 118 and flip-flop 122. The operation of these circuits is discussed in greater detail later.

There may be a large number of decoder gates 24. Only three of these gates 114, 109 and 112 are illustrated. Each receives a different combination of three inputs from the flip-flops of the bit pattern register 22. It should be appreciated that even the three flip-flops shown can produce outputs which are permuted in $2^3$ or eight different ways. Accordingly, these flip-flops can actuate at least eight different "nor" gates. Further, the decoder gates can, if desired, also include "or" gates for deriving many more than three commands from the three gates shown. For example, "nor" gate 109 may apply its output to four different "or" gates so as to produce four command signals when it is enabled. In a similar manner, "nor" gate 114 may apply its output to two of the "or" gates which receive outputs from "nor" gate 109 and two, three, or more other "or" gates and so on. Again, these features are not directly involved in the present invention and accordingly are not illustrated or discussed further.

In a preferred form of the present invention, the decoder gates 24 are distributed, that is, they are positioned not in the central control area of the computer but close to the networks they control. Accordingly, the leads between the flip-flops of the bit pattern register and the decoder gates may be relatively long. This may introduce problems as discussed in application Serial No. 116,592, filed June 12, 1961, by W. J. Gesek and L. L. Rakoczi and assigned to the same assignee as the present invention. This application discusses the use of an encoder between the bit pattern register and the flip-flops to solve such problems. As this encoder is not directly involved in the present invention, it is not shown here or discussed further.

The commands produced by the decoder gates are applied to the networks 26, 28 and 30. When these have completed their operation, they produce return signals $W_1$, $W_2$ and $W_3$. These return signals are applied to the circuits 32 for sensing the return. These circuits include delay line 128, "or" gate 130, delay line 132 and flip-flop 124.

Some of the blocks in FIGS. 4 and 5 have not yet been mentioned, however, they will be discussed presently in connection with the discussion of the operation of the system which follows.

In the operation of the system of FIGS. 4 and 5, first a general reset signal GR is applied directly to flip-flops 38, 40, 42, 52, 54, 92, 122 and 124 to reset these flip-flops. The general reset signal GR is also applied through "or" gate 130 (bottom of FIG. 5) to reset flip-flops 104, 106 and 108. The resetting of flip-flops 40 and 42 primes one input to "nor" gates 46 and 50. These gates remained disabled, however, as their second input GN is "one."

When an operation code is recognized, the signal PD on lead 154 upper left of FIG. 4 changes to "zero." Assume now that the start execution of operation signal SEO is made "one." This sets flip-flop 38. Now the four inputs to "nor" gate 56 are all "zero." (The flip-flops 52 and 54 are reset so that $\bar{A}$ and $\bar{B}$ are both equal to "zero"; PD is also equal to "zero"; the 1 output of flip-flop 38 is also equal to "zero.") When "nor" gate 56 is enabled, it produces the machine instruction signal $MI_1=1$. This signal sets flip-flop 40 priming one input to "nor" gate 44.

Skipping now for a moment to "nor" gates 62, 66 and 70, prior to the appearance of machine instruction signal on one of leads 156, 158 and 160, these "nor" gates receive a "one" input from "nor" gates 60, 64 and 68, respectively. Accordingly, "nor" gates 62, 66 and 70 each produce a "zero" output. These three "zero" outputs are received by "nor" gate 72 so that it produces a "one" ouput which is applied through delay line 74 to input 150 of "nor" gate 76. Accordingly, the "nor" gate 76 is disabled and produces a "zero" output.

Returning now to the bus 156, 158, 160, lead 158 carries a "one." This "one" is applied to "nor" gates 60 and 64 disabling these "nor" gates so that each produces a "zero" output. The "zero" output is applied to "nor" gates 62 and 66. These "nor" gates also receive a "zero" input from the 0 terminal of flip-flop 92 which is in the reset state. Accordingly, "nor" gates 62 and 66 become enabled and "nor" gate 70 remains disabled. Thus, the bit pattern $BP_1=110$ appears on the output leads 130, 132, 134 of the bit pattern generator. This pattern immediately disables "nor" gate 72.

To summarize the operation so far, the machine instruction generator has produced an $MI_1=1$ output. This output has been applied to the bit pattern generator and a bit pattern appears on bus 130, 132, 134. Gate 72 senses the presence of the bit pattern and becomes disabled, a "zero" appearing at its output.

After the delay introduced by delay means 74, the "zero" output of "nor" gate 72 appears at input lead 150 to "nor" gate 76. Flip-flop 92 is reset so that input 152 to the "nor" gate 76 is also "zero." Accordingly, "nor" gate 76 produces a "one" output, the mark signal, and "and" gate 84 receives this "one" output on its input lead 162. The second input to "and" gate 84 is the 1 output of flip-flop 124 which is reset. Accordingly, "and" gate 84 becomes enabled. The "one" output of "and" gate 84 is applied via leads 170, 172 and 174 as a "one" input ($TB=1$) to "and" gates 78, 80 and 82, thereby priming these "and" gates. Therefore, the bit pattern corresponding to $MI_1$, that is, the bit pattern $BP_1=110$ passes through "and" gates 78, 80 and 82 to the flip-flops 104, 106 and 108. This pattern sets flip-flops 104 and 106 but flip-flop 108 remains reset. Three of the four inputs to decoder gate 109 are now "zero," however, the fourth input is a "one." This fourth input is the 1 output of flip-flop 122.

Summarizing again for a moment, the bit pattern on leads 130, 132 and 134 has been applied through the input gates 78, 80 and 82 of the bit pattern register to the bit pattern flip-flops. These flip-flops store the bit pattern for the present.

The "one" output of "and" gate 84 is applied through leads 170, 172 and delay means 90 as a $DB=1$ set signal for flip-flop 92. This disables "nor" gate 76 since lead 152 now carries a "one." Accordingly, the output of "and" gate 84 becomes "zero." This "zero" output is applied via leads 170 and 176 to "nor" gate 118. The second input to "nor" gate 118 is the signal appearing on lead 178. This input initially is a "zero" since a "one" input was formerly present on lead 180. After a time determined by the delay imparted by delay means 120, a "one" appears at lead 178. However, for the interval of delay means 120, two zeros are present at the input to "nor" gate 118 and therefore this "nor" gate produces a "one" output ($EC=1$ and $IB=1$ pulses) for a time equal to the delay of delay line 120. The delay imparted by delay means 120 is sufficient to produce an output pulse of sufficient duration to set flip-flop 122. This output pulse EC (execute command) causes a "zero" to be applied to "nor" gate 109 so that the four inputs to this "nor"

gate are all "zero." Accordingly, "nor" gate 109 applies a "one" to the network 26 to which it is connected.

The "one" output of "nor" gate 118 is also applied as a set signal IB (inhibit transfer of bit pattern to register) to flip-flop 124. This produces a "zero" on output lead 182 to the flip-flop and this "zero" is applied back to "and" gate 84. Accordingly, this "and" gate is now "latched" to produce a "zero" output so that the input gates 78, 80, 82 of the bit pattern register 22 are disabled.

Returning now to the bit pattern generator 20, the "one" output of the delay means 90 has set flip-flop 92 disabling the gates 62, 66 and 70 of the bit pattern generator. This "one" output is also applied via leads 164 and 166 as a reset signal DG (disable gates) for the flip-flop 38. The reset flip-flop 38 disables the machine instruction generator output gates 56, 58 and 59. The "one" output is delayed by delay means 94 and inverted by inverter 96 so as to prime "nor" gates 44, 46, 48 and 50. Flip-flop 40 is set and flip-flop 42 is reset so that "nor" gates 44 and 50 become enabled. The output of gate 44 sets flip-flop 52 and flip-flop 54 remains reset. The outputs of these flip-flops are now $A=0$ and $\bar{B}=0$.

The "zero" output of inverter 96 is applied through inverter 100 to input 190 of "nor" gate 102. The inverter 100 converts the "zero" to a "one" so that "nor" gate 102 remains disabled for the present.

"Nor" gate 86 (FIG. 5, upper center) receives three inputs from the leads 130, 132 and 134, respectively. As the "nor" gates 62, 66 and 70 are now disabled by the output of set flip-flop 92, these three inputs are "zero." The fourth input to "nor" gate 86 is the "zero" output of "nor" gate 76. The fifth input to "nor" gate 86 is the "zero" output of "and" gate 84. Accordingly, all five inputs to "nor" gate 86 are "zero" and the "nor" gate produces a "one" output. This "one" output is stretched by delay means 88 and is applied as a signal SN (send next bit pattern to input gates of bit pattern register) which resets flip-flop 92. Thus, "nor" gates 62, 66 and 70 are again primed and ready to send the next bit pattern.

Concurrently with the above, the "zero" output of "and" gate 84 (FIG. 5) has been applied via leads 170, 172 and 128, delay means 90, lead 164, and delay means 94 to the inverter 96. This inverter produces a "one" at its output which is applied through inverter 100 to "nor" gate 102. Thus, a "zero" appears on input lead 190. A "zero" is also present at this time at input lead 192. Accordingly, "nor" gate 102 produces an output signal $EG=1$ (enable output gates of machine instruction generator) which sets flip-flop 38. The flip-flop thereupon applies a "zero" as a fourth input to "nor" gate 58.

Returning for a moment to the circuit 98, 100 and 102, the duration of the "one" output pulse produced by "nor" gate 102 is equal to the delay imparted by delay means 98. After this delay interval, a "one" appears at lead 192 cutting off "nor" gate 102.

When "nor" gate 58 is enabled, it produces an $MI_2=1$ output on lead 160. This second machine instruction signal disables "nor" gates 64 and 68 so that they both produce "zero" outputs. These "zero" outputs are applied as inputs to "nor" gates 66 and 70 which, as previously mentioned, also receive a "zero" from the flip-flop 92. Accordingly, the bus 130, 132, 134 now carries the bit pattern $BP_2=011$. The input gates 78, 80 and 82 to bit pattern register are disabled so that the bit pattern is effectively waiting on the bus.

Summarizing briefly somewhat the things that have occurred, a first machine instruction signal has been generated. It has produced a first bit pattern. This first bit pattern has been stored in the bit pattern register and has actuated one of the decoder gates. The decoder gate has applied a command to the network 26 controlled by the first machine instruction signal. This network is proceeding to perform its function as, for example, addition. In the meantime, the input gates to the bit pattern register have been disabled, the next machine instruction signal $MI_2$ has been generated and a bit pattern corresponding to the second machine instruction signal $MI_2$ has been generated. This bit pattern $BP_2$ has been placed on the bus leading to the disabled input gates to the bit pattern register. It might also be mentioned that the presence of the second bit pattern has already been sensed by the circuit 36 (FIG. 1) and it is preparing to disable the output gates of the machine instruction generator and to generate the next machine instruction. There are sufficient delays in the system to insure that this does not occur before the bit pattern waiting to be transferred into the bit pattern register is so transferred, as is discussed shortly.

When the network 26 has completed the operation it is performing, it produces a return $W_1$ which is applied to the circuits 32. The first output of circuits 32 is TC (terminate transmission of command) which is applied to reset flip-flop 122. This flip-flop now applies a "one" output to the decoder gates thereby disabling all these gates and terminating the command applied to network 26. The $W_1$ signal is delayed by delay means 129 and applied through "or" gate 130 as a signal RR (reset register) to reset the flip-flops 104, 106 and 108 of the bit pattern register. The bit pattern register is now in condition to receive the bit pattern waiting on leads 130, 132 and 134.

The output of "or" gate 130 is further delayed by delay means 132 and the delayed signal TB' (transfer bit pattern to register) is applied as a reset signal to flip-flop 124. This flip-flop now produces a "one" output on lead 182 which is applied as an input to "unlatch" "and" gate 84. The second input to "and" gate 84 is also a "one." Flip-flop 92 is reset and "none" gate 72 produces a "zero" output in the presence of a bit pattern on leads 130, 132 and 134. The "one" output of "and" gate 84 is applied via leads 170, 174 as an enabling signal for "and" gates 78, 80 and 82 so that these gates now apply the bit pattern which is waiting on leads 130, 132, 134 to the bit pattern register.

The remainder of the operation should now be clear. Shortly after the bit pattern passes into the register, this is sensed by the circuit including delay means 90 and flip-flop 92. The flip-flop 92 is set disabling the bit pattern generator output gates. A new machine instruction signal is then generated and applied to the input gates to the bit pattern generator and so on.

Figure 7A:
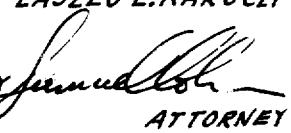

A table summarizing the operation discussed above appears in FIGS. 7a and 7b.

In the data processing system under discussion, after a sequence of machine instructions have been generated, a signal is applied to the other machine instruction generator discussed briefly previously. This other machine instruction generator resets the instruction register and, in a series of steps, obtains a new instruction from the memory and applies it to the instruction register. In the process, the signal PD becomes "zero" inactivating the machine instruction generator shown in FIGS. 4 and 5. Thereafter, the instruction decoder decodes the operation portion of the instruction word stored in the instruction register and applies a start signal either to the machine instruction generator shown or to some other machine instruction generator in the computer.

The circuit of FIG. 6 is a simplified showing of one way in which the sequence of machine instructions is terminated and the machine instruction generator reset. The "nor" gate which produces the last machine instruction signal is shown at 59. It is assumed that the last machine instruction signal is $MI_3$. This signal is applied through inverters 200 and 202 to "nor" gate 204. The delay line 206 is connected from the output of inverter 200 to the second input to "nor" gate 204.

In operation, if the machine instruction signal $MI_3$ is not present, lead 208 carries a "zero" and lead 209 carries a "one." This "one" is applied through delay means 206 to the "nor" gate 204. Accordingly, "nor" gate 204 is disabled.

When MI₃ is present, lead 208 carries a "one." This "one" is inverted by stage 200 and inverted again by stage 202 so that a "one" is applied to input 210 to the "nor" gate. A "zero" is present at lead 209. This "zero" is applied through delay means 206 to input lead 211 to the "nor" gate 204. The "nor" gate 204 is still disabled.

When MI₃ terminates, lead 208 changes from "one" to "zero." This "zero" appears at lead 210. Lead 211 already is carrying a "zero" so that "nor" gate 204 becomes enabled and produces an output $TMS=1$. This output pulse has a duration equal to the delay inserted by delay means 206. After this delay, the "one" present at lead 209 is applied to lead 211 and "nor" gate 204 becomes disabled.

The signal TMS (terminate machine instruction signal sequence) may be applied as a stop and reset signal to the machine instruction generator. This signal, for example, may be applied as a reset signal for flip-flops 40, 42, 52, 54 (FIG. 4). It may also be applied as a disabling signal to "nor" gate 102. Flip-flop 38 is already reset by the $DG=1$ signal from leads 164, 166. Finally, TMS may be applied to the other machine instruction generator (not shown) which applies a reset signal to the instruction register. Upon receipt of this reset signal, the signal PD from the instruction decoder 12a changes from "zero" to "one" disabling the output gates 56, 58 and 59 of the machine instruction generator 18. All stages in the machine instruction generator 18 are now in condition to start a new cycle of operation. The new cycle begins when PD becomes "zero" and SEO becomes "one."

The various delays in the system have been mentioned in passing. The discussion below is to point out in somewhat greater detail the reasons for the various delays and the values, in a qualitative way, of the different delays.

The delay introduced by networks 72, 74, 76 is for the purpose of compensating for the difference in transmission times through, for example, gates 60, 62 and gates 64, 66. Thus, when a mark equal "one" signal appears, it is certain that all bits making up a given pattern are present on the bit pattern leads 130, 132 and 134 before the input gates 78, 80 and 82 are enabled.

The delay introduced by delay means 90 is made sufficiently long to insure that the outputs of "and" gates 78, 80 and 82 have sufficient time to set the flip-flops of the bit pattern register. The longer that lead 128 is, the shorter the delay introduced by delay means 90 needs to be.

The network 116, 118, 120 is essentially a pulse generator. It produces an output pulse when the signal on input lead 172 changes from "one" to "zero." The duration of the output pulse is equal to the delay introduced by delay means 120 (assuming that the length of time a "zero" appears on lead 172 is longer than the delay of 120). Accordingly, delay means 120 is made sufficiently long so that the output pulse can set the flip-flops 122 and 124.

The network 98, 100, 102 (FIG. 4) is also a pulse generator. However, the configuration of this generator is such that a change in the input appearing on lead 97 from "zero" to "one" produces an output pulse. Again, the delay means 98 introduces a delay sufficient so that the output pulse can set the flip-flop 38.

What is claimed is:

1. In a control system for a digital data processing system, a plurality of stages connected in cascade, each for generating signals upon receipt of signals from the preceding stage, and the final stage producing command signals for controlling the operation of the data processing system; an input circuit for said final stage; means responsive to the transfer of a signal to said final stage for disabling the input circuit to said final stage, applying the succeeding signal destined for the final stage to said disabled input circuit, and initiating a command signal; means for subsequently terminating said command signal; and means responsive to the termination of said command signal for clearing said final stage, and for enabling the input circuit to said final stage.

2. In a control system for an asynchronous digital data processing system, a plurality of stages connected in cascade, each for generating signals upon receipt of signals from the preceding stage, and the final stage producing command signals for controlling the operation of the data processing system, said final stage including an input circuit; means responsive to the transfer of a signal to said final stage for disabling said input circuit to said final stage, applying the succeeding signal destined for the final stage to said disabled input circuit, and initiating a command signal; a circuit to which the command signal is applied for executing a computer operation and for producing a return signal when said operation is completed; and means responsive to said return signal for terminating said command signal, clearing said final stage, and enabling said input circuit.

3. In a control system for a data processing system, a plurality of stages connected in cascade, each for generating signals upon receipt of signals for the preceding stage, and the final stage including a register, input gates to the register, and decoder gates which receive different combinations of the register output voltages for producing command signals; means responsive to the presence of signals at said input gates and a reset condition of said register for enabling said input gates, whereby said signals pass through said input gates to said register; means including delay means for concurrently disabling the output circuit of the stage preceding said input gates, disabling said input gates, and enabling said decoder gates, after said signals have passed to said register; and means for reenabling the output circuit of the stage preceding said input gates during the time said input gates are disabled.

4. In a control system for an asynchronous digital data processing system, a plurality of stages connected in cascade, each for generating signals upon receipt of signals from the preceding stage, and the final stage including a register, input gates to the register, and decoder gates which receive different combinations of the register output voltages for producing command signals; means responsive to the presence of signals at said input gates and a reset condition of said register for enabling said input gates, whereby said signals pass through said input gates to said register; means for enabling said decoder gates after said signals pass into said register, whereby at least one command signal is produced, and for disabling said input gates; a circuit to which said command signal is applied for executing a computer operation, and upon completion thereof producing a return signal; and means responsive to said return signal for disabling said decoder gates, whereby said command signal is terminated, resetting said register, and reenabling said input gates.

5. In a data processing system, an instruction decoder; a machine instruction generator coupled to the decoder for generating a sequence of machine instruction signals in response to a particular output from the decoder; a bit pattern generator coupled to the machine instruction generator for generating a pattern of binary bits in response to each machine instruction signal; a register which includes input gates coupled to the bit pattern generator for storing the patterns of bits produced by the latter; decoder gates coupled to the bit pattern register for receiving combinations of outputs from the register for producing command signals; and means for enabling the decoder gates for producing the command signals and concurrently disabling the input gates to the register.

6. In a data processing system, an instruction decoder; a machine instruction generator coupled to the decoder for generating a sequence of machine instruction signals in response to a particular output from the decoder; a bit pattern generator coupled to the machine instruction generator for generating a pattern of binary bits in response to each machine instruction signal; a register which includes input gates coupled to the bit pattern generator for storing the patterns of bits produced by the latter; decoder gates coupled to the bit pattern register for receiving different combinations of outputs from the register, for producing command signals; and means responsive to a pattern of bits produced by said bit pattern generator for enabling said input gates of said register.

7. In a data processing system, an instruction decoder; a machine instruction generator coupled to the decoder for generating a sequence of machine instruction signals in response to a particular output from the decoder; a bit pattern generator which includes output gates coupled to the machine instruction generator for generating a pattern of binary bits in response to each machine instruction signal; a register which includes input gates coupled to the bit pattern generator for storing the patterns of bits produced by the latter; decoder gates coupled to the bit pattern register for receiving different combinations of outputs from the register, for producing command signals; and means responsive to a pattern of bits produced by said bit pattern generator for enabling said input gates of said register and then disabling said output gates of said bit pattern generator.

8. In a data processing system, an instruction decoder; a machine instruction generator coupled to the decoder for generating a sequence of machine instruction signals in response to a particular output from the decoder, said generator including a machine instruction register and decoder output gates for the register; a bit pattern generator coupled to the machine instruction generator for generating a pattern of binary bits in response to each machine instruction signal, said generator including output gates; a register coupled to the bit pattern generator for storing the patterns of bits produced by the latter, said register including input gates; decoder gates coupled to the bit pattern register for receiving different combinations of outputs from the register, for producing command signals; and means responsive to the presence of a bit pattern produced by the bit pattern generator for enabling the input gates to the bit pattern register, then disabling the same input gates, and disabling the output gates of the bit pattern generator.

9. In a data processing system, an instruction decoder; a machine instruction generator coupled to the decoder for generating a sequence of machine instruction signals in response to a particular output from the decoder, said generator including a machine instruction register and decoder output gates for the register; a bit pattern generator coupled to the machine instruction generator for generating a pattern of binary bits in response to each machine instruction signal, said generator including output gates; a register coupled to the bit pattern generator for storing the patterns of bits produced by the latter, said register including input gates; decoder gates coupled to the bit pattern register for receiving different combinations of outputs from the register, for producing command signals; means for disabling the output gates of the bit pattern generator after the bit pattern is stored in the bit pattern register, and concurrently disabling the decoder output gates of the machine instruction generator; and means for disabling said output gates of the machine instruction generator and for storing a new bit pattern in the machine instruction register, after the decoder output gates of the machine instruction register are disabled.

10. In a data processing system, an instruction decoder; a machine instruction generator coupled to the decoder for generating a sequence of machine instruction signals in response to a particular output from the decoder, said generator including a machine instruction register and decoder output gates for the register; a bit pattern generator coupled to the machine instruction generator for generating a pattern of binary bits in response to each machine instruction signal, said generator including output gates; a register coupled to the bit pattern generator for storing the patterns of bits produced by the latter, said register including input gates; decoder gates coupled to the bit pattern register for receiving different combinations of outputs from the register, for producing command signals; means responsive to the presence of a bit pattern produced by the bit pattern generator for enabling the input gates to the bit pattern register, then disabling the same input gates, and disabling the output gates both of the bit pattern generator and machine instruction generator; and means responsive to the disabling of the output gates of the bit pattern register for applying a new bit pattern to the register of the machine instruction generator, and enabling the output gates both of the machine instruction generator and the bit pattern generator.

11. A machine instruction generator comprising, a first register having an input circuit for receiving set and reset signals; a second register; normally disabled gates between the two registers for applying the word produced in the first register to the second register; decoder output gates coupled to the second register and responsive to different bit patterns stored in the second register; connections from the decoder output gates to said input circuit of the first register for applying signals to said first register and thereby changing the bit pattern stored therein; and means for successively disabling said output gates, then enabling said gates between the two registers, then disabling said last named gates, then enabling said output gates.

12. In a control system for an asynchronous data processing system, a machine instruction generator for generating time sequential machine instruction signals, said generator including output gates; a bit pattern generator for generating a bit pattern in response to each machine instruction signal, said bit pattern generator including input gates and output gates; a bit pattern register for storing the generated bit pattern, said register including input gates; means responsive to the generation of a bit pattern by said bit pattern generator for transferring the bit pattern through the output gates of the bit pattern generator and the input gates of the bit pattern register to the bit pattern register, then disabling the output gates of the bit pattern generator and disabling the output gates of the machine instruction generator, and applying a signal to the machine instruction generator calling for the generation of the next machine instruction signal.

13. In a control system for an asynchronous data processing system, a machine instruction generator for generating time sequential machine instruction signals, said generator including output gates; a bit pattern generator for generating a bit pattern in response to each machine instruction signal, said bit pattern generator including input gates and output gates; a bit pattern register for storing the generated bit pattern, said register including input gates; a bit pattern decoder for decoding a bit pattern stored in said bit pattern register; and means responsive to the recipt of a bit pattern by the bit pattern register for disabling the input gates to the bit pattern register, enabling the bit pattern decoder, enabling the output gates to the machine instruction generator, and enabling the output gates of the bit pattern generator.

14. In a control system for an asynchronous data processing system, a machine instruction generator for generating time sequential machine instruction signals, said generator including output gates; a bit pattern generator for generating a bit pattern in response to each machine instruction signal, said bit pattern generator including input gates and output gates; a bit pattern register for storing the generated bit pattern, said register including input gates; and a bit pattern decoder for decoding a bit pattern stored in said bit pattern register; an operating circuit responsive to a decoded bit pattern for performing an operation and, upon completion of that operation, generating a return signal; and means responsive to said return signal for disabling said bit pattern decoder, resetting said bit pattern register, and enabling the input gates to said bit pattern register.

15. In a control system for an asynchronous data processing system, a machine instruction generator for generating time sequential machine instruction signals, said generator including output gates; a bit pattern generator for generating a bit pattern in response to each machine instruction signal, said bit pattern generator including input gates and output gates; a bit pattern register for storing the generated bit pattern, said register including input gates; a bit pattern decoder for decoding a bit pattern stored in said bit pattern register; an operating circuit responsive to a decoder bit pattern for performing an operation and upon completion of that operation generating a return signal; means responsive to the generation of a bit pattern by said bit pattern generator for transferring the bit pattern through the output gates of the bit pattern generator and the input gates of the bit pattern register to the bit pattern register, then disabling the output gates of the bit pattern generator and disabling the output gates of the machine instruction generator, and applying a signal to the machine instruction generator calling for the generation of the next machine instruction signal; means responsive to the receipt of a bit pattern by the bit pattern register for disabling the input gates to the bit pattern register, enabling the input gates to the bit pattern decoder, enabling the output gates of the machine instruction generator, and enabling the output gates of the bit pattern generator; and means responsive to said return signal for disabling said bit pattern decoder, resetting said bit pattern register, and enabling the input gates to said bit pattern register.

References Cited by the Examiner

UNITED STATES PATENTS

| | | | |
|---|---|---|---|
| 2,733,184 | 12/1956 | Rolf | 328—59 |
| 2,782,867 | 2/1957 | Hall | 328—59 |
| 3,012,723 | 12/1961 | Goertzel et al. | 340—172.5 |
| 3,045,958 | 9/1962 | Bensky et al. | 340—172.5 |
| 3,067,937 | 12/1962 | Henkein et al. | 340—172.5 |
| 3,113,295 | 12/1963 | Blocher | 340—172.5 |

ROBERT C. BAILEY, *Primary Examiner.*

MALCOLM A. MORRISON, *Examiner.*

B. REIN, P. L. BERGER, *Assistant Examiners.*